United States Patent
Dietzel et al.

(10) Patent No.: US 6,359,755 B1
(45) Date of Patent: Mar. 19, 2002

(54) MICROMECHANICAL CANTILEVER SUSPENSION SYSTEM

(75) Inventors: Andreas Dietzel, Wallertheim; Friedrich Fleischmann, Erlangen, both of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/354,941

(22) Filed: Jul. 15, 1999

(30) Foreign Application Priority Data

Jul. 24, 1998 (DE) .......................... 198 33 388

(51) Int. Cl.$^7$ .............................. G11B 5/48
(52) U.S. Cl. .................................. 360/244.3
(58) Field of Search ................. 360/244.2, 244.3, 360/244.4, 244.9

(56) References Cited

U.S. PATENT DOCUMENTS

| | | | |
|---|---|---|---|
| 4,760,748 A | | 7/1988 | Pal et al. |
| 4,760,478 A | | 8/1988 | Pal et al. ................... 360/104 |
| 4,761,699 A | | 8/1988 | Ainslie et al. ............. 360/103 |
| 4,774,610 A | * | 9/1988 | Kinjo ........................ 360/104 |
| 4,797,763 A | * | 1/1989 | Levy et al. ................ 360/104 |
| 4,819,094 A | * | 4/1989 | Oberg ........................ 360/104 |
| 4,991,045 A | * | 2/1991 | Oberg ........................ 360/104 |
| 4,996,616 A | * | 2/1991 | Aoyagi et al. ............. 360/104 |
| 4,996,623 A | | 2/1991 | Erpelding et al. ......... 360/104 |
| 5,126,904 A | * | 6/1992 | Sakurai ...................... 360/104 |
| 5,299,081 A | * | 3/1994 | Hatch et al. ............... 360/104 |
| 5,408,372 A | * | 4/1995 | Karam, II ................... 360/104 |
| 5,461,525 A | * | 10/1995 | Christianson et al. .... 360/104 |
| 5,486,963 A | * | 1/1996 | Jones, Jr. .................. 360/104 |
| 5,551,997 A | * | 9/1996 | Marder et al. ............. 148/437 |
| 5,572,387 A | | 11/1996 | Brooks et al. ............. 360/104 |
| 5,594,607 A | * | 1/1997 | Erpelding et al. ......... 360/104 |
| 5,606,477 A | | 2/1997 | Erpelding et al. ......... 360/104 |
| 5,650,894 A | * | 7/1997 | Ikeda ......................... 360/104 |
| 5,663,854 A | * | 9/1997 | Grill et al. .................. 360/104 |
| 5,734,524 A | * | 3/1998 | Ruiz .......................... 360/104 |
| 5,734,526 A | * | 3/1998 | Symons ..................... 360/104 |
| 5,793,569 A | * | 8/1998 | Christianson et al. .... 360/104 |
| 5,801,905 A | * | 9/1998 | Schirle et al. ............. 360/104 |
| 5,812,342 A | * | 9/1998 | Khan et al. ................. 360/104 |
| 5,825,590 A | * | 10/1998 | Ohwe ........................ 360/104 |
| 5,850,319 A | * | 12/1998 | Tangren ..................... 360/104 |
| 5,862,010 A | * | 1/1999 | Simmons et al. ......... 360/97.01 |
| 5,973,883 A | * | 10/1999 | Yanagisawa ............... 360/104 |
| 6,091,574 A | * | 7/2000 | Misso ........................ 360/104 |
| 6,212,043 B1 | * | 4/2001 | Nakamura et al. ........ 360/244.3 |
| 6,215,623 B1 | * | 4/2001 | Zhu ........................... 360/244.3 |
| 6,219,203 B1 | * | 4/2001 | Arya et al. ................. 360/244.2 |
| 6,271,996 B1 | * | 8/2001 | Houk et al. ................ 360/244.9 |
| 6,297,933 B1 | * | 10/2001 | Khan et al. ................ 360/244.2 |
| 6,310,746 B1 | * | 10/2001 | Hawwa et al. ............ 360/97.01 |

FOREIGN PATENT DOCUMENTS

EP 0617407 A2 9/1994

OTHER PUBLICATIONS

D. Mee et al., Magnetic Recording, vol. 2, New York, 1988, p. 45.

"Laminated Suspension with Horizontal Head/Slider in a Data Recording Disk File", IBM Technical Disclosure Bulletin, vol. 38, No. 6, Jun. 1995, pp. 341–343.

* cited by examiner

*Primary Examiner*—Brian E. Miller
(74) *Attorney, Agent, or Firm*—Douglas R. Millett

(57) ABSTRACT

Briefly, in a preferred embodiment, the present invention comprises a suspension having a structured surface hardening. This surface hardening may be comprised of thin film stripes of material such as nitrides, carbides, and adamantine carbon. The hardened layer has a thickness in the range of 10–100 nm.

12 Claims, 4 Drawing Sheets

MICROMECHANICAL CANTILEVER SUSPENSION SYSTEM

BACKGROUND OF THE INVENTION

1. Field of the Invention

The invention presented refers to a procedure for the selective influencing of natural oscillation in fine and micromechanical cantilever systems. In particular, the invention refers to magnet head suspension systems in magnetic disk drives.

2. Description of the Prior Art

Magnetic disk drives which use a transducer mounted on a slider for reading and/or writing data to at least one rotating magnetic disk are generally known. In such systems, the slider is normally coupled using a suspension system to an actuator arm. A suspension system normally consists of the base plate which creates the connection to the actuator, the actual suspension arm (load beam) and the gimbal, a flexible connecting element to the slider. The suspension is normally designed in steel.

The use of laminated materials is also known in the manufacture of slider suspension systems (see U.S. Pat. Nos. 4,996,623 and 4,761,699).

In addition, it is also known that oscillations in the arm and the suspension in magnetic disk drives can produce undesired effects such as departing from the read/write track or variations in the distance between the slider and the disk.

These oscillations occur due to the resonance phenomena at certain natural frequencies of the slider. In this, extreme mechanical influences through the drive, air flow, etc. play a part. When resonance phenomena are excited, the whole structure (suspension) is deformed in wave-type movements, so-called oscillation modes.

The aim of a so-called "modal analysis" is to characterize the dynamic characteristics of the system. The modal parameters of resonance frequency, damping and form of the modes can be established experimentally or through finite-element simulation.

One known possibility for reducing such oscillations is to bring an elasto-viscous material into the suspension system supporting the slider (see U.S. Pat. No. 4,760,478, amongst others), whereby oscillation energy is converted to heat.

To damp undesired oscillations, so-called "constrained layers" can also be used (see U.S. Pat. No. 5,606,477).

With the increasing storage density in information storage media such as magnetic disk drives, the necessity for slider suspension systems which reduce oscillations to a minimum is increasing.

U.S. Pat. No. 5,572,387 describes a "Head Suspension Assembly" where the load beam is at least partly equipped with an elasto-viscous coating in order to dampen oscillations.

In U.S. Pat. No. 5,606,477, a slider suspension system is described which has a laminated suspension where the laminate is a conductive layer consisting of a copper alloy, a dielectric polyimide layer and a strengthening layer of special steel. A pattern of "land areas" is etched into the conductive layer, which function as a constraining area for the elasto-viscous dielectric layer. This construction damps existing oscillations in the suspension system.

Solutions known in the current state of technology have the disadvantage that although they damp oscillations, they are unable selectively to influence natural oscillations (characterized by resonance frequencies and the shape of modes). In this way, the oscillation modes in normal systems are already established by the form and material of the suspension. However, if one changes, for example, the external form in order to achieve an effect on oscillation modes, there is the danger that one will simultaneously inadvertently affect the air flow. Conversely, this can lead to a changed excitation of oscillations.

SUMMARY OF THE INVENTION

The invention presented is not limited to magnetic head suspension systems for magnetic disk drives. It can be used generally for fine and micromechanical systems such as cantilevers, as used in scanning probe microscopy. For the sake of simplicity, however, it is illustrated below in terms of magnetic suspension systems.

It is thus the task of the invention presented to produce a suspension which allows undesired natural oscillations in the suspension to be selectively prevented.

A further task of the invention presented is to be able to carry out a control of the oscillation modes without changing the basic material and geometric form of the suspension.

Briefly, in a preferred embodiment, the present invention comprises a suspension having a structured surface hardening. This surface hardening may be comprised of thin film stripes of material such as nitrides, carbides, and adamantine carbon. The hardened layer has a thickness in the range of 10–100 nm.

The invention has the advantage that it can be realized in fine or micromechanical systems using normal coating and photolithographic processes.

For a fuller understanding of the nature and advantages of the present invention, reference should be made to the following detailed description taken in conjunction with the accompanying drawings.

DESCRIPTION OF THE PREFERRED EMBODIMENTS

Figure 1A:
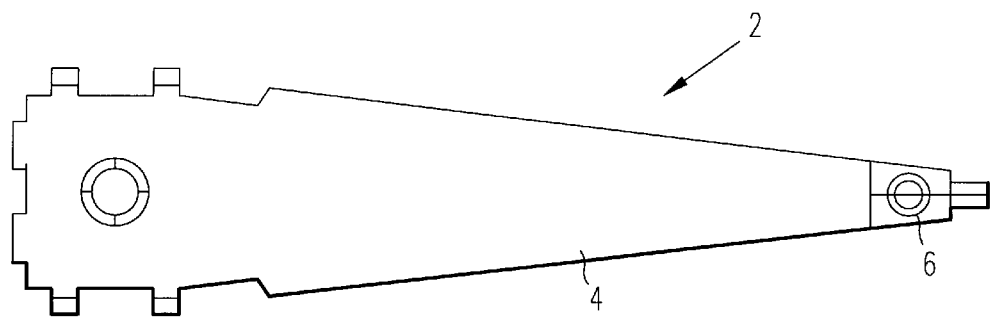
FIG. 1A is a schematic diagram of a suspension system.
Figure 1B:
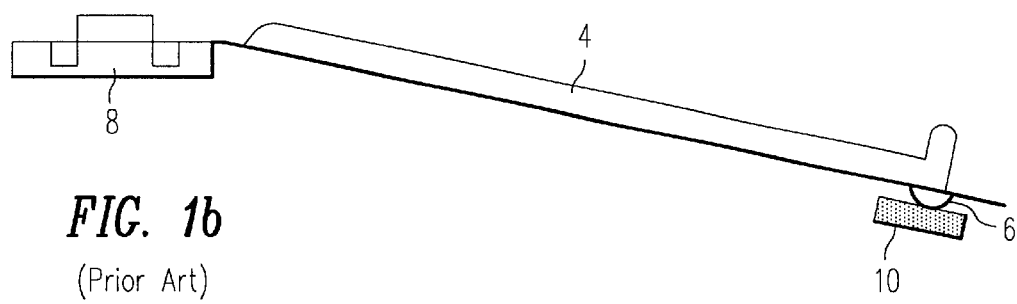
FIG. 1B shows the suspension system of FIG. 1A as a side view.

FIGS. 1A and 1B show a schematic diagram of the structure of a suspension system 2. Basically, it consists of the suspension arm 4 (load beam), a (cardanic) suspension 6 (gimbal) and the base plate 8. This is used as a connection element between the actuator arm (not shown) and the magnet head suspension 2. The suspension arm is the backbone of this suspension. The magnet head 10 is cardanically suspended at the end of the arm.

The natural frequencies of the suspension are given by the use of certain materials and the geometry. In the most unfavorable case, these natural oscillations are excited by other components of the overall system such as the drive. As a result, this leads to resonance which can lead to faulty read/write behavior and, in the worst case, to the failure of the whole system.

Figure 2A:
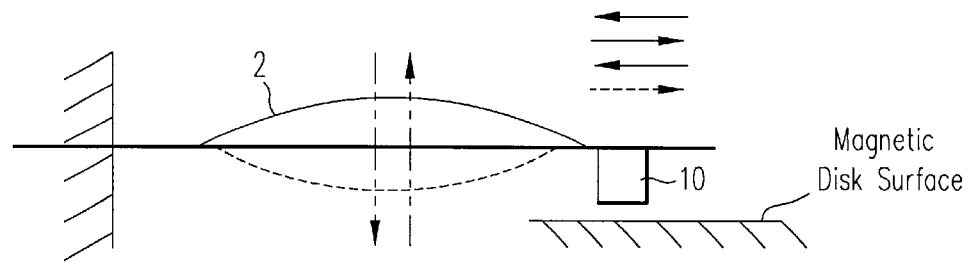
FIGS. 2A & 2B show two examples for oscillation modes of the suspension which can affect the read signal.
Figure 2B:
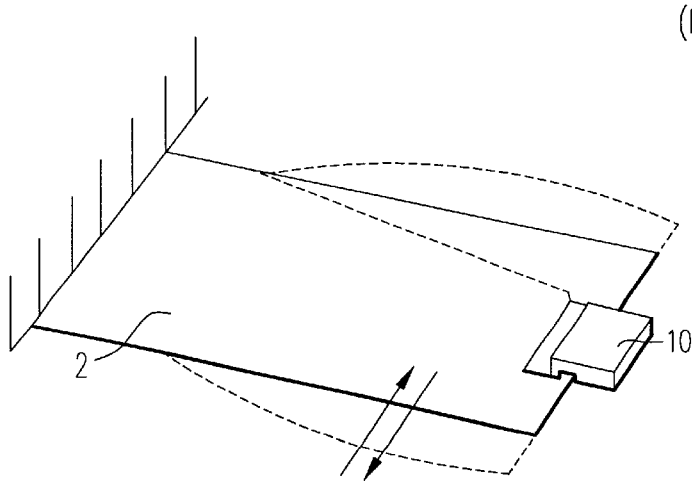

One example of such oscillation states is shown in FIGS. 2A and 2B. In this, FIG. 2A shows the "out-of-plane" mode and FIG. 2B shows the "in-plane" mode (from C. Denis Mee and Eric D. Daniels, "Magnetic recording", Vol. 2, page 45, New York 1988).

Figure 3A:
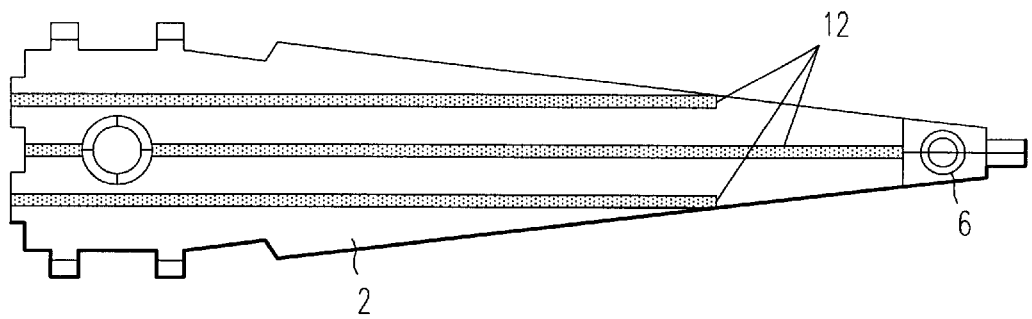
FIGS. 3A & 3B are schematic diagrams of a suspension system modified according to the invention.
Figure 3B:
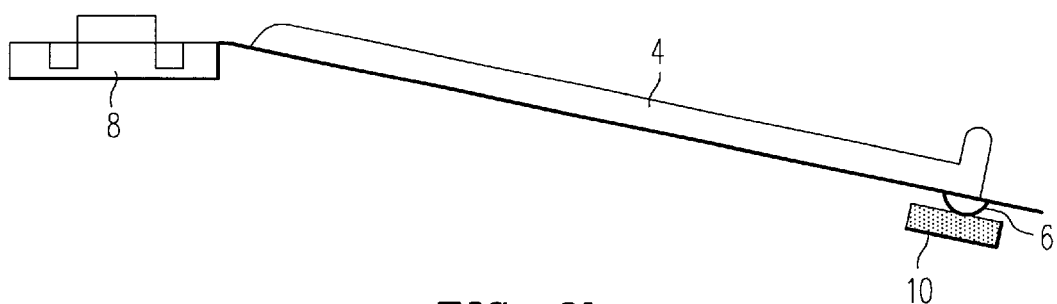

In order to selectively influence these natural oscillations therefore, a structured hard material layer is applied. This means that the whole suspension does not necessarily have to be coated with this hard material layer but that a more or less large area of the suspension has to be coated according to the existing oscillations. An example of this is shown in FIG. 3A. Here, the suspension arm is coated with the hard material 12 in stripes. From the side view shown in FIG. 3B it can be seen that the geometry is unaffected by the application of the hard material layer.

In this way, the existing natural oscillations in the suspension can be selectively influenced or translated as the material characteristics and the spring rate of the suspension change through the application of the hard material layer.

The hard material layer consists of a thin film of great hardness and good adhesive force so that it can be applied to the magnetic head suspension in such a way that it is not loosened through normal stresses.

Possible materials for the hard material layer in the invention are adamantine carbon such as nitrides and carbides, particularly TiN and BN.

By the structured application of this layer, the natural frequencies of the slider suspension are selectively translated. This can be done as required, i.e., depending on which of the natural frequencies is critical for the special system. Equally, the form of the oscillation modes can be influenced by the structure so that the locations of the oscillation bulges can generally be moved to a non-critical range. Even different modes can be affected in different ways by non-isotropic structuring. The thickness of the thin film layer normally moves in the range of approx. 10–100 nm.

Particular advantages of this invention are offered by a monolithic integration of slider and suspension as will be required in increasing future miniaturization in storage systems. Here the hard material layers which are applied to the slider to minimize wear can be structured so that in a second function, they can selectively influence the oscillations.

An additional application of the described procedure can be found in the application in a scanning probe cantilever, whose natural frequency and oscillation modes represent critical parameters for certain applications and which can be generally adapted using the described procedure.

Figure 4:
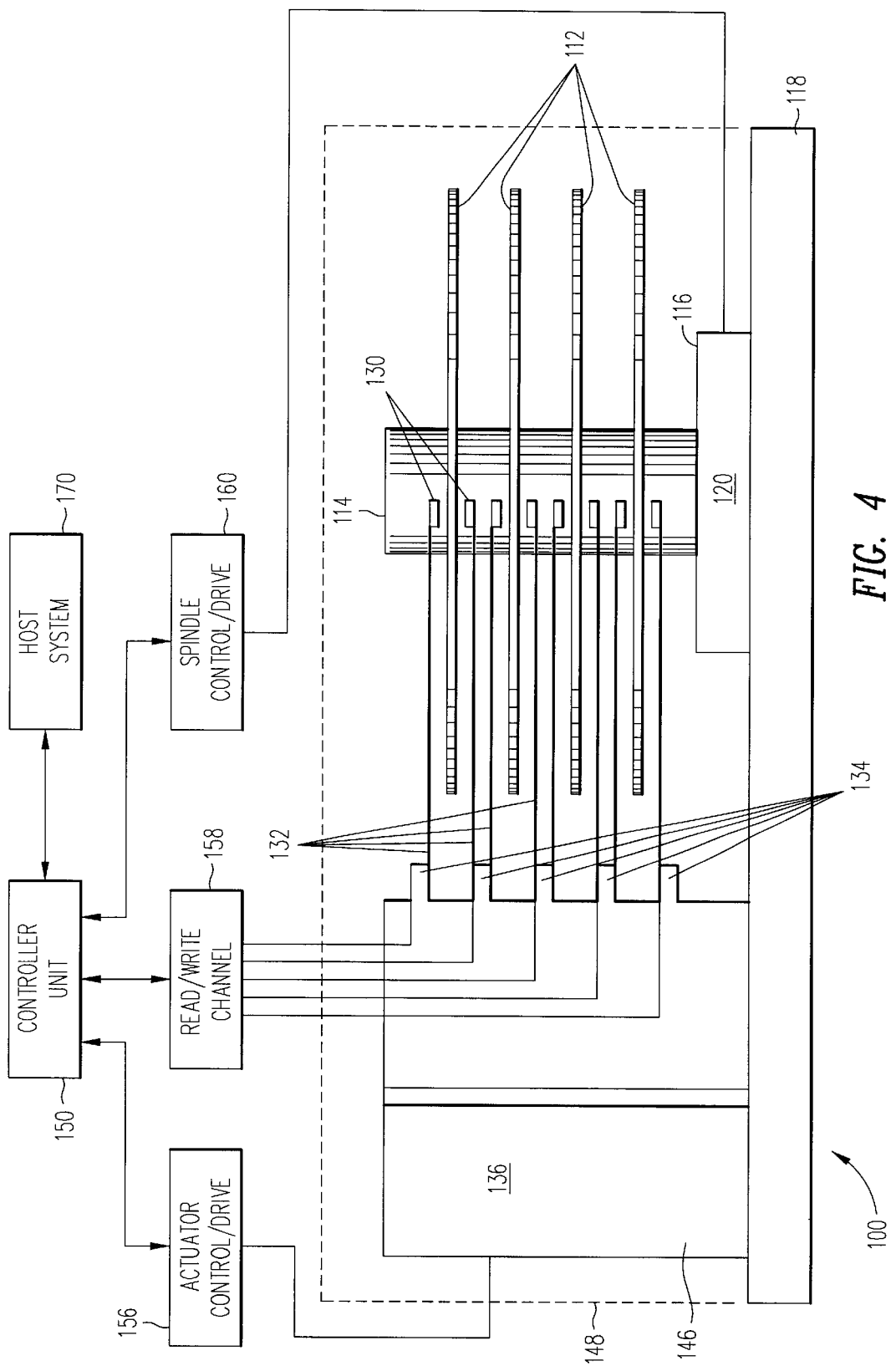
FIG. 4 is a schematic diagram of a data storage system of the present invention.
Figure 5:
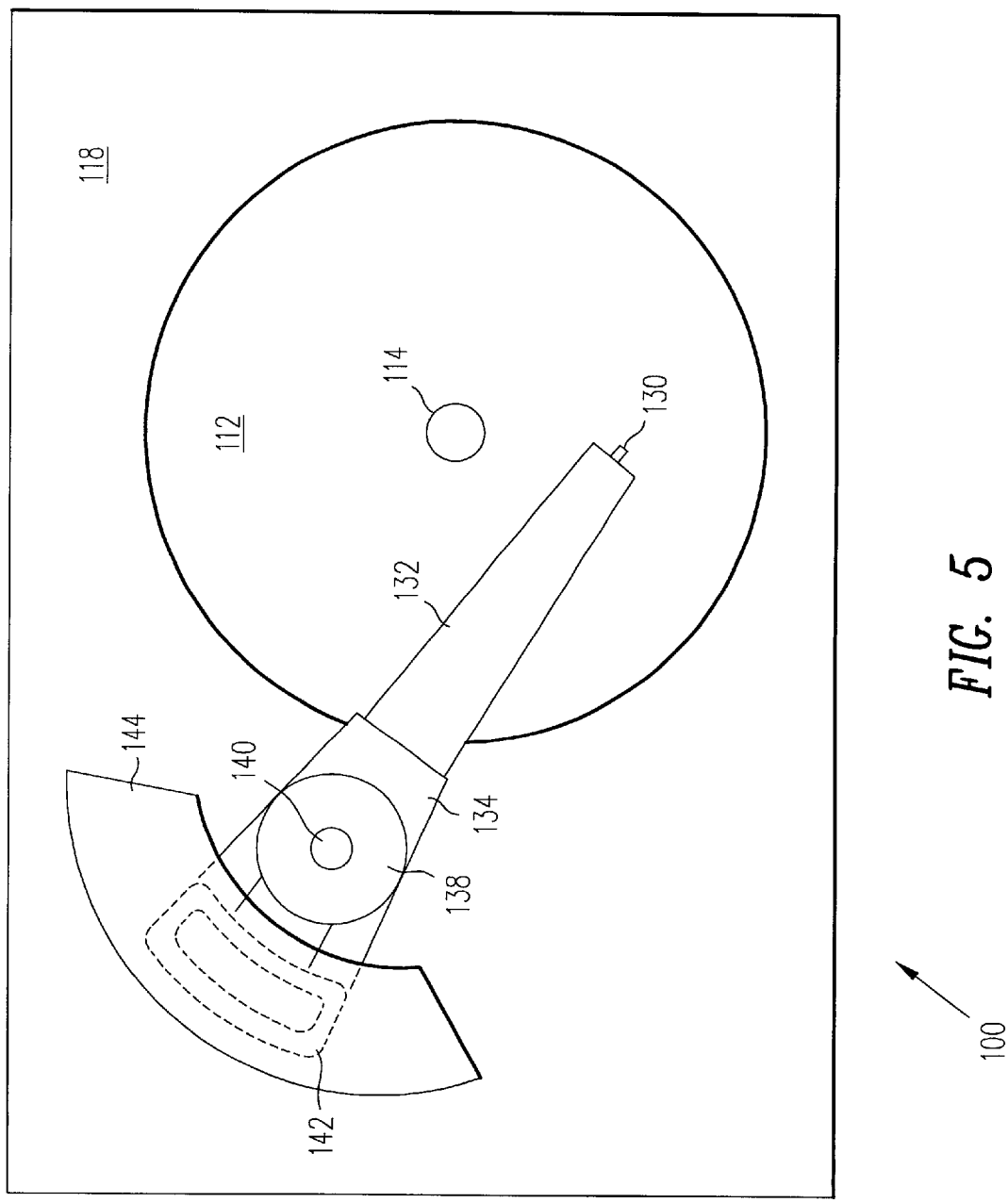
FIG. 5 is a top view of the system of FIG. 4.

FIGS. 4 and 5 show schematic diagrams of the data storage system using the suspension of the present invention which is designated by the general reference number 100. System 100 comprises a plurality of magnetic recording disks 112. Each disk has a plurality of concentric data tracks. Disks 112 are mounted on a spindle motor shaft 114, which is connected to a spindle motor 116. Motor 116 is mounted to a chassis 118. The disks 112, spindle 114, and motor 116 comprise a disk stack assembly 120.

A plurality of transducer assemblies or heads 130 are positioned over the disks 112 such that each surface of the disks 112 has a corresponding head 130. The head 130 is comprised of an air bearing slider and read and write transducer elements. Each head 130 is attached to one of a plurality of suspensions 132 (similar to suspension 2 of FIG. 3A) which in turn are attached to a plurality of actuator arms 132. Arms 134 are connected to a rotary actuator 136. In a preferred embodiment, the arms 134 are an integral part of a rotary actuator comb. Actuator 136 moves the heads in a radial direction across disks 112. Actuator 136 typically comprises a rotating member 138 mounted to a rotating bearing 140, a motor winding 142 and motor magnets 144. Actuator 136 is also mounted to chassis 118. Although a rotary actuator is shown in the preferred embodiment, a linear actuator could also be used. The heads 130, suspensions 132, arms 134 and actuator 136 comprise an actuator assembly 146. the disk stack assembly 120 and the actuator assembly 146 are sealed in an enclosure 148 (shown by a dashed line) which provides protection from particulate contamination.

A controller unit 150 provides overall control to system 100. Controller unit 150 typically contains a central processing unit (CPU), memory unit and other digital circuitry. Controller 150 is connected to an actuator control/drive unit 156 which in turn is connected to actuator 136. This allows controller 150 to control the movement of heads 130 over disks 112. The controller 150 is connected to a read/write channel 158 which in turn is connected to the heads 130. This allows controller 150 to send and receive data from the disks 112. Controller 150 is connected to a spindle control/drive unit 160 which in turn is connected to spindle motor 116. This allows controller 150 to control the rotation of disks 112. A host system 170, which is typically a computer system, is connected to the controller unit 150. System 160 may send digital data to controller 150 to be stored on disks 112, or may request the digital data be read from disks 112 and sent to the system 170. The basic operation of DASD units is well known in the art.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A suspension system comprising:
    a load beam;
    a gimbal for receiving a transducer element; and
    a structured hardened surface attached to the load beam, the hardened surface comprising a thin film material having a hardness and adhering to the load beam, wherein the hardened surface comprises three parallel stripes, a first stripe running along a center longitudinal axis of the load beam, from a base region to the gimbal, the second and third stripes flanking the first stripe and running from the base region to an edge of the load beam.

2. The system of claim 1, wherein the hardened surface overlies only a portion of the load beam.

3. The system of claim 1, further comprising a slider having the transducer element connected to the gimbal.

4. The system of claim 1, wherein the hardened surface consists of a material selected from the group containing nitrides, carbides, and adamantine carbon.

5. The system of claim 4, wherein the hardened surface is TiN or BN.

6. The system of claim 1, wherein the hardened surface has a thickness in the range of 10–100 nanometers.

7. A data storage system comprising:

a load beam;

a gimbal for receiving a transducer element;

a structured hardened surface attached to the load beam, the hardened surface comprising a thin film material having a hardness and adhering to the load beam, wherein the hardened surface comprises three parallel stripes, a first stripe running along a center longitudinal axis of the load beam, from a base region to the gimbal, the second and third stripes flanking the first stripe and running from the base region to an edge of the load beam;

a transducer element attached to the gimbal;

a data recording media located proximate to the transducer element;

a media movement device for moving the media; and a transducer movement device for moving the transducer element relative to the media.

8. The system of claim 7, wherein the hardened surface overlies only a portion of the load beam.

9. The system of claim 7, further comprising a slider having the transducer element connected to the gimbal.

10. The system of claim 7, wherein the hardened surface consists of a material selected from the group containing nitrides, carbides, and adamantine carbon.

11. The system of claim 10, wherein the hardened surface is TiN or BN.

12. The system of claim 7, wherein the hardened surface has a thickness in the range of 10–100 nanometers.

* * * * *